United States Patent [19]

Laube

[11] Patent Number: 5,382,621
[45] Date of Patent: Jan. 17, 1995

[54] SKIM COMPOUNDS INCORPORATING LOW ASH CARBON BLACKS

[75] Inventor: Stephen G. Laube, Duluth, Ga.

[73] Assignee: Cabot Corporation, Boston, Mass.

[21] Appl. No.: 6,559

[22] Filed: Jan. 21, 1993

[51] Int. Cl.$^6$ .............................................. C08K 3/04
[52] U.S. Cl. .................................... 524/496; 524/495
[58] Field of Search ................................ 524/495, 496

[56] References Cited

U.S. PATENT DOCUMENTS 3,943,093  3/1976  Feniak .
4,267,079  5/1981  Davis et al. ........................ 524/526

OTHER PUBLICATIONS

"Carbon Blacks for Rubber Applications"; Cabot Corporation, North American Rubber-Black Division, Atlanta, GA (Mar. 1989).

*Primary Examiner*—Edward J. Cain
*Attorney, Agent, or Firm*—Lawrence A. Chaletsky

[57] ABSTRACT

Fabric or wire skim compounds having low moisture absorption properties that comprise rubber and a carbon black having an ash content of less than or equal to 0.2% by weight, preferably less than or equal to 0.1%, by weight, a structure represented by DBP (dibutyl phthalate absorption) of 50–160 cubic centimeters per 100 gram (cc/100 g), an Iodine Number ($I_2$No.) of 10–180 milligrams per gram (mg/g), preferably 50–130 mg/g, and a Tint value of 30–140%, preferably 60–140 %. More preferably, the carbon black is further characterized by having a CDBP of 40–120 cc/100 g, preferably 50–120 cc/100 g, and a CTAB level of 10–125 square meters per gram ($m^2/g$), preferably 60–125 $m^2/g$. Also disclosed are reinforcing materials cited with skim compounds of the present invention.

13 Claims, 2 Drawing Sheets

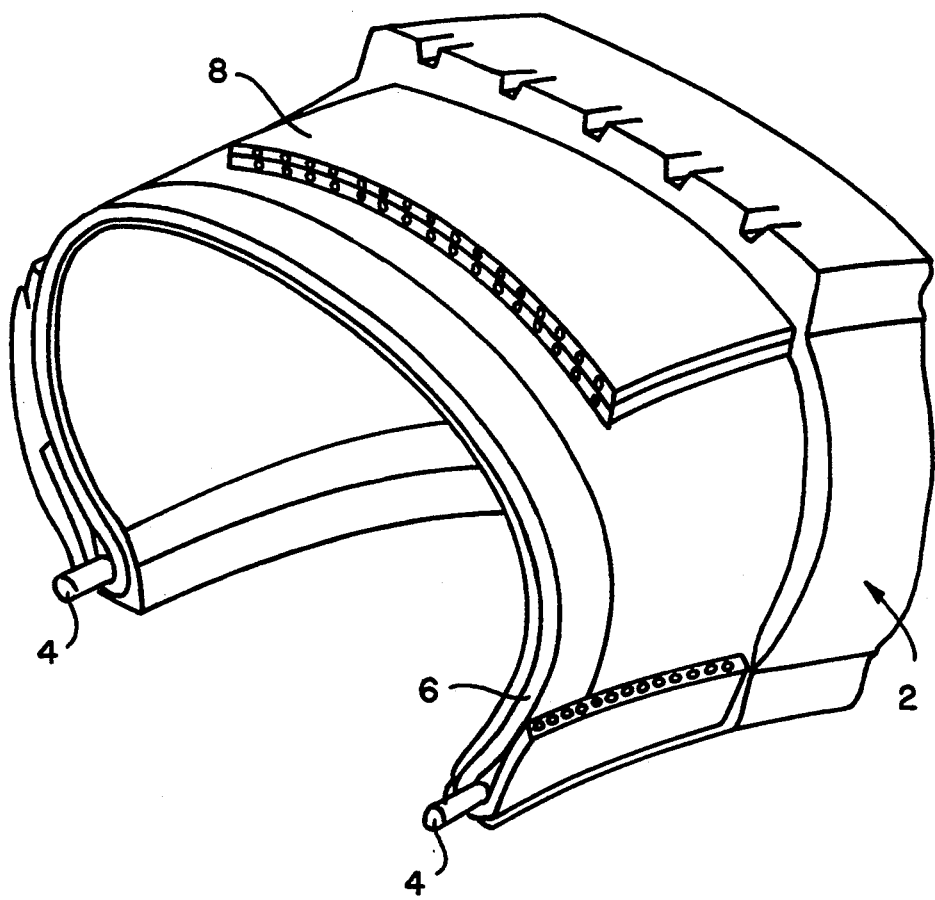

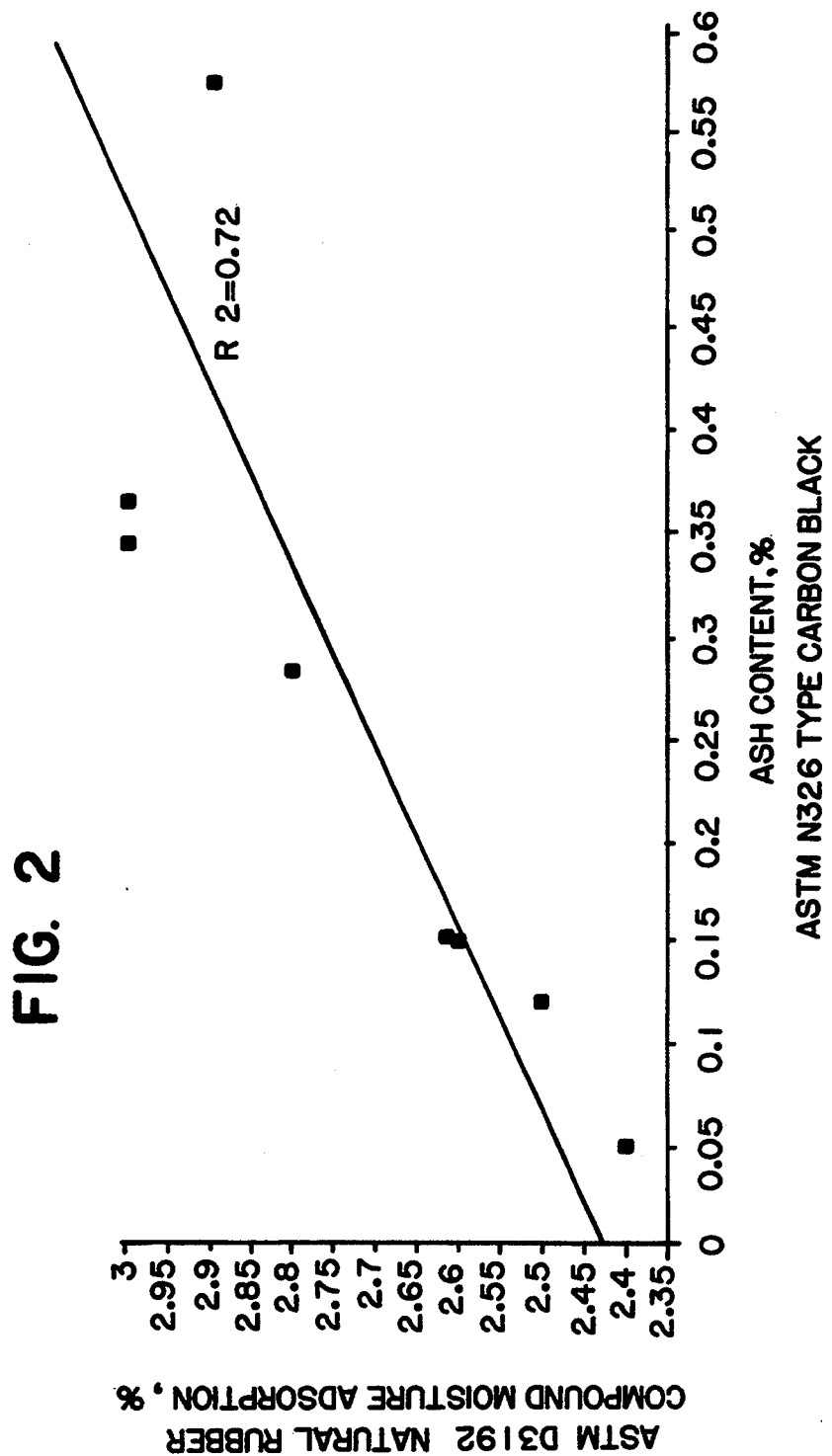

SKIM COMPOUNDS INCORPORATING LOW ASH CARBON BLACKS

FIELD OF THE INVENTION

The present invention relates to fabric or wire skim compounds incorporating a low ash carbon black and having low compound moisture absorption characteristics. The present invention also relates to products utilizing the skim compounds of the present invention, including industrial rubber applications such as hoses, v-belts, conveyer belts and the like, and particularly including tires. The skim compounds of the present invention are advantageous for use in any application where it is desirable to have low moisture absorption characteristics, particularly including tires.

BACKGROUND

Degradation of the adhesion between rubber and steel or wire reinforcement material is a decades old problem that has been magnified by the growth in steel reinforced pneumatic automobile and truck tires. Tires which are run in an overloaded condition, large size tires, tires run at high speeds, and tires subject to cutting in the tread and or sidewall are particularly susceptible to failure between the rubber compound used to coat the steel and the steel itself. Steel, or steelcord or wire, as used herein refer to the fine strands of brass plated extruded steel twisted together in various configurations and used under the tread area, in the beads, and or in the main body of the tire itself to give added strength to the tire. Skim compounds as used herein refer to the compounds that are utilized to coat the steel, steelcord, wire or fabric reinforcing material in tires. Skim compounds as used herein also refers to the compounds that are utilized to coat the steel, steelcord, wire or fabric reinforcing material utilized in other applications, such as industrial rubber applications which include v-belts, conveyer belts, hoses and the like.

The following terms, known to those of ordinary skill in the tire art, are also used herein. Tread ply refers to a steel or fabric reinforcing member found just under the tread and extending only under the tread area of the tire. Carcass plies are parallel longitudinal reinforcing members which are wrapped around the beads and which may also be steel or fabric. Carcass refers to all tire components excluding the tread, tread ply, undertread, and sidewall, but including the beads, carcass ply (plies), and various ancillary rubber components.

The adhesion problem between the steel, steel cord or wire, and the skim compound, in heretofore known technologies, is also aggravated by constructions which result in cut ends of the steel material coming into direct contact with the rubber compounds as those ends are devoid of the brass plating normally used to enhance the adhesion process. In tires, loss of adhesion between the compound and the steel can result in premature tire failure at the worst, reduced retreadability, uneven treadwear, and a non uniform ride condition (thump and balance).

Adhesion between rubber and steel or wire reinforcements is particularly important in the area of the retreadability of steel truck tires, which are commonly made with steel reinforced treads and carcasses. The economic life of such tires depends on their ability to be retreaded multiple times. One of the major causes of non-retreadability and of failure of the retread on the road is adhesion caused by corrosion of the reinforcing steelcord. Tire manufacturer literature even specifies that the air used to inflate the tire be run through desiccants to insure that it has a very low moisture level.

The presence of moisture in the skim compound itself has been shown to be particularly detrimental to wire adhesion, resulting in rust formation (oxidation of the steelcord) and rapid loss of adhesion. Tires run in snowy areas have been shown to be particularly prone to early rusting and failure due to the presence of salt on the roads. The highly corrosive water and salt solution present on the roads can enter the carcass of the tire through small cuts or cracks in the tread and sidewall area.

Prior art has also shown that moisture in rubber skim compounds leads to degradation of the cure system and generation of amines. This results in non uniform cure rates which give non uniform tensile, modulus, elongation, tear strength and flex resistance. The corrosive nature of amines is particularly troublesome when they are generated in a compound which coats polyester fabric or steel reinforcing material of a tire, either in the tread ply, carcass ply, or bead area, or any other application incorporating the skim compound.

The rubber industry has developed several tests to measure the moisture absorbing tendencies of the skim rubber compounds. These tests subject the cured rubber/steel or rubber/fabric test piece to accelerated moisture exposure, including high humidity, immersion in water, exposure to steam, and immersion in a brine solution. These tests attempt to duplicate the most troublesome service conditions and ensure that the skim compounds and steelcord and fabric constructions chosen maximize the resistance to the detrimental effects of moisture.

Because of industry wide problems in this area, including one of the largest passenger tire recalls in industry history, much work has been done on the adhesion mechanism. The content and thickness of the brass plating on the steelcord, the cure system of the rubber compound, and the presence of certain additives such as cobalt have been shown to improve the adhesion level to a point that results in acceptable product performance in certain cases.

The present invention advantageously provides another method for minimizing the loss of adhesion between the skim compound and the steel, steelcord, wire or fabric reinforcing material. The present invention may be utilized alone, or in conjunction with prior methods for minimizing the loss of adhesion.

SUMMARY OF THE INVENTION

We have discovered skim compounds that minimize the aforementioned disadvantages by minimizing the amount of moisture to which the fabric, wire or steel reinforcements are exposed. The present invention provides a carbon black reinforced skim compound which may be utilized to coat the fabric and/or wire reinforcing material in tires and other products. The skim compound of the present invention provides a tire with superior tread ply and carcass durability while maintaining other necessary properties in the tire. The skim compound of the present invention is also advantageous for use in other applications utilizing skim compounds, such as industrial rubber applications, including v-belts, conveyer belts, hoses and the like.

The skim compounds of the present invention comprise rubber and a carbon black having an ash content of less than or equal to 0.2% by weight, preferably less than or equal to 0.1%, by weight, a structure represented by DBP (dibutyl phthalate absorption) of 50–160 cubic centimeters per 100 gram (cc/100 g), an Iodine Number (I$_2$No.) of 10–180 milligrams per gram (mg/g), preferably 50–130 mg/g, and a Tint of 30–140%, preferably 60–140%. More preferably, the carbon black is further characterized by having a CDBP of 40–120 cc/100 g and a CTAB level of 10–125 square meters per gram (m$^2$/g).

The skim compounds of the present invention minimize the detrimental effect of moisture on fabric and steel reinforcing material, and adhesion, and thus on products utilizing the skim compound, by minimizing the tendency of the carbon black utilized in the skim compound to absorb moisture. Thus the amount of moisture capable of being introduced into the compound is limited, and also the tendency of the skim compound, containing the carbon black, to absorb moisture is limited. As a result, the service life of the products utilizing the skim compound is increased.

The rubber component of the skim compound of the present invention comprises any natural or synthetic rubber, or mixtures thereof. Generally, amounts of the carbon black ranging from about 10 to about 300 parts by weight can be used for each 100 parts by weight of rubber in order to impart a significant degree of reinforcement thereto. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Among the rubbers suitable for use with the present invention are any natural rubber, synthetic rubber, or mixtures thereof, and their derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

BRIEF DESCRIPTION OF THE DRAWINGS

FIG. 1 is a cross-sectional view of a tire.

FIG. 2 is a graph depicting the effects of ash content on compound moisture absorption.

DETAILED DESCRIPTION OF THE INVENTION

The present invention includes skim compounds comprising:
rubber, and
a carbon black having:
ash $\leq$ 0.2% by weight, preferably $\leq$ 0.1%, by weight;
50 cc/100 g $\leq$ DBP $\leq$ 160 cc/100 g;
10 mg/g $\leq$ I$_2$No. $\leq$ 180 mg/g, preferably 50 mg/g $\leq$ I$_2$No. $\leq$ 130 mg/g; and
30% $\leq$ Tint $\leq$ 140%, preferably 60% $\leq$ Tint $\leq$ 140%.

More preferably, the skim compounds of the present invention comprise:
rubber and
a carbon black having:
ash $\leq$ 0.2% by weight, preferably $\leq$ 0.1%, by weight;
50 cc/100 g $\leq$ DBP $\leq$ 160 cc/100 g;
10 mg/g $\leq$ I$_2$No. $\leq$ 180 mg/g, preferably 50 mg/g $\leq$ I$_2$No. $\leq$ 130 mg/g; and
30% $\leq$ Tint $\leq$ 140%, preferably 60% $\leq$ Tint $\leq$ 140%.
40 cc/100 g $\leq$ CDBP $\leq$ 120 cc/100 g
10 m$^2$/g $\leq$ CTAB $\leq$ 125 m$^2$/g.

FIG. 1 depicts a tire using skim compounds of the present invention. The tire (2) comprises a pair of wire bead rings (4) which are coated with rubber, and may advantageously be coated with the skim compounds of the present invention. The steel or fabric carcass plies (6) wrapped around the bead rings may also advantageously be coated with the skim compounds of the present invention. The steel or fabric reinforcement plies, generally referred to as tread plies, under the tread area (8) are a further application for the skim compounds of the present invention. The tire (2) shown in FIG. 1 is representative of a passenger tire constructed in a manner conventional in the art.

The following testing procedures are used in the determination and evaluation of the analytical properties of the carbon blacks of the skim compounds of the present invention, and the physical properties of the skim compounds.

The CTAB of the carbon blacks was determined according to ASTM Test Procedure D3765-85. The I$_2$No. of the carbon blacks was determined according to ASTM D1510. The Tint value of the carbon blacks was determined according to ASTM Test Procedure D3265-85a. The CDBP of the carbon black pellets was determined according to the procedure set forth in ASTM D 3493-86. The DBP of the carbon black pellets was determined according to the procedure set forth in ASTM D2414. The ash level of the carbon blacks was determined by the procedure set forth in ASTM D1506.

The modulus, tensile and elongation of the skim rubber compounds were measured by the procedure set forth in ASTM D412.

The Shore A Hardness of the skim rubber compounds was determined according to the procedure set forth in ASTM D2240-86.

The viscosity of the skim rubber compounds was determined by the procedure set forth in ASTM D1646.

The scorch of the skim rubber compounds was determined by the procedure set forth in ASTM D1646.

The die "C" tear, of the skim rubber compounds was determined by the procedure set forth in ASTM D624.

The Compound Moisture Absorption (CMA) of the skim rubber compounds was determined according to the following procedure.

1) A compound sample, nominally 4 inch by 6 inch by 0.080 inch thickness, is maintained for at least one hour at 23±2° C. and 50±5% relative humidity.
2) The sample is weighed and the weight recorded as dry weight.
3) The sample is submerged 1 inch under water in a desiccator can. The lid of the can is sealed with silicone grease.
4) The desiccator can is placed in an aging oven, maintained at 70° C., and left for a specified time period, which in the Examples was 2 or 7 days.
5) The can is removed from the oven and the sample removed from the can. The sample is dried by lightly wiping with paper towels.
6) The sample is maintained for 30 minutes at 23±2° C. and 50±5% relative humidity.
7) The sample is re-weighed and the weight recorded as final weight.
8) Compound Moisture Absorption (CMA) is calculated by the following formulas:

$$\text{(Final Weight)} - \text{(Dry Weight)} = \text{Difference};$$

$$\frac{\text{Difference}}{\text{Dry Weight}} \times 100 = \% \text{ water absorption} = CMA.$$

The effectiveness and advantages of the present invention will be further illustrated by the following examples.

EXAMPLE 1

This example illustrates the properties of natural and synthetic rubber compounds of the present invention, produced utilizing a low ash ASTM N326 type carbon black (Carbon Black 1), in comparison with conventional natural and synthetic rubber compounds produced utilizing a control ASTM N326 type carbon black (Carbon Black 2). The ASTM N326 type carbon black is representative of a commonly used carbon black in wire and fabric skim applications.

The analytical properties of the carbon blacks are shown in Table 1:

TABLE 1

| Type | Carbon Black | |
|---|---|---|
| | 1 Low Ash | 2 Control |
| Ash (%, by weight) | 0.03 | 0.43 |
| CTAB (m²/g) | 80.0 | 82.0 |
| I$_2$No. (mg/g) | 80.0 | 83.0 |
| DBP (cc/100 g) | 70.0 | 72.0 |
| Tint (%) | 108.0 | 110.0 |
| CDBP (cc/100 g) | 68.0 | 70.0 |

Carbon blacks 1 and 2 were incorporated into natural rubber according to the ASTM Natural Rubber Recipe (ASTM D3192). Carbon black 1 was incorporated into Natural Rubber Compound A, which was a compound of the present invention. Carbon black 2 was incorporated into Natural Rubber Compound B which served as a control. Natural rubber compounds A and B were prepared incorporating each of the carbon black samples according to the rubber formulation shown below in Table 2:

TABLE 2

| ASTM D3192 Natural Rubber Formulation | |
|---|---|
| INGREDIENT | Parts by weight |
| Natural Rubber | 100.00 |

TABLE 2-continued

| ASTM D3192 Natural Rubber Formulation | |
|---|---|
| INGREDIENT | Parts by weight |
| Carbon Black | 50.00 |
| Zinc Oxide | 5.00 |
| Stearic Acid | 3.00 |
| MBTS | 0.60 |
| Sulfur | 2.50 |

MBTS = mercapto 2-benzothiazole sulfenamide.

The properties of these natural rubber compounds were then evaluated according to the ASTM procedures described herein. The results were as shown in Table 3:

TABLE 3

| | ASTM D3192 Natural Rubber Compound | |
|---|---|---|
| | A (present invention) | B (Control) |
| Carbon Black | 1 | 2 |
| Viscosity, MS4 at 121° C. | 36.0 | 35.0 |
| Scorch, MS at 121° C., T10 min. | 11.0 | 11.0 |
| Tensile Strength, MPa | 26.6 | 25.5 |
| 300% Modulus, MPa | 9.0 | 9.3 |
| Elongation, % | 635 | 624 |
| Die "C" Tear, 15 min., kN/m | 126.8 | 99.6 |
| Shore A2 Hardness, 40 min., 20° C. | 62.0 | 63.0 |
| CMA, 2 days % | 2.01 | 2.39 |
| CMA, 7 days % | 2.97 | 3.56 |

These results show that the natural rubber compounds of the present invention have compound moisture absorption (CMA) levels, after 2 days, and 7 days, approximately 16% lower than the control rubber compound incorporating the carbon black with higher ash content, with the remaining properties being substantially equivalent. It is therefore expected that the fabric or wire skim compounds of the present invention will result in longer service lives in any application where moisture is known or suspected to cause a problem.

Carbon blacks 1 and 2 were also incorporated into synthetic rubber according to the ASTM Synthetic Rubber Recipe (ASTM D3191). Carbon black 1 was incorporated into Synthetic Rubber Compound C, which was a compound of the present invention. Carbon black 2 was incorporated into Synthetic Rubber Compound D which served as a control. Synthetic rubber compounds C and D were prepared incorporating each of the carbon black samples according to the rubber formulation shown below in Table 4.

TABLE 4

| ASTM D3191 Synthetic Rubber Formulation | |
|---|---|
| INGREDIENT | Parts by weight |
| SBR 1500 | 100.00 |
| Carbon Black | 50.00 |
| Zinc Oxide | 3.00 |
| Stearic Acid | 1.00 |
| N-tert butyl 2-benzothiazole sulfenamide | 1.00 |

SBR 1500 = a styrene-butadiene copolymer.

The properties of the synthetic rubber compounds were then evaluated according to the ASTM procedures described herein. The results were as shown in Table 5:

TABLE 5

| | ASTM D3191 Synthetic Rubber Compound | |
|---|---|---|
| | C (present invention) | D (Control) |
| Carbon Black | 1 | 2 |
| Viscosity, MS4 at 121° C. | 73.4 | 75.0 |
| Scorch, MS at 121° C., T10 min. | 24.0 | 24.0 |
| Tensile Strength, Mpa | 25.48 | 24.2 |
| 300% Modulus, MPa | 12.4 | 11.6 |
| Elongation, % | 519 | 502 |
| Die "C" Tear, 15 min., kN/m | 52.2 | 56.0 |
| Shore A2 Hardness, 40 min., 20° C. | 66.0 | 66.0 |
| CMA, 2 days % | 1.19 | 1.63 |
| CMA, 7 days % | 1.53 | 2.33 |

These results show that the synthetic rubber compounds of the present invention have compound moisture absorption (CMA) levels approximately 27% lower, after 2 days, and approximately 34% lower, after 7 days, than the control rubber compound incorporating the carbon black with higher ash content, with the remaining properties being substantially equivalent. It is therefore expected that the fabric or wire skim compounds of the present invention will result in longer service lives in any application where moisture is known or suspected to cause a problem.

EXAMPLE 2

This example illustrates rubber compounds of the present invention prepared utilizing a ASTM N440 type carbon blacks which have lower surface areas than the carbon blacks utilized in Example 1. Also shown are the properties imparted by a low ash ASTM N440 type carbon black (Carbon Black 3), and an ASTM N440 type control carbon black (Carbon Black 4), in natural rubber and styrene butadiene rubber.

The properties of the carbon blacks were as shown in Table 6:

TABLE 6

| | Carbon Blacks | |
|---|---|---|
| | 3 | 4 |
| Type | Low Ash | Control |
| Ash (%, by weight) | 0.09 | 0.42 |
| CTAB (m²/g) | 59.0 | 62.0 |
| I₂No. (mg/g) | 56.5 | 59.6 |
| DBP (cc/100 g) | 66.5 | 63.0 |
| Tint (%) | 92.1 | 97.2 |
| CDBP (cc/100 g) | 63.2 | 59.7 |

Carbon blacks 3 and 4 were incorporated into the natural rubber formulation described in Example 1. Carbon black 3 was incorporated into Natural Rubber Compound E, which was a compound of the present invention. Carbon black 4 was incorporated into Natural Rubber Compound F which served as a control. The properties of these natural rubber compounds were then evaluated according to the ASTM procedures described herein. The results were as shown in Table 7:

TABLE 7

| | ASTM D3192 Natural Rubber Compound | |
|---|---|---|
| | E (present invention) | F (Control) |
| Carbon Black | 3 | 4 |
| Viscosity, MS4 at 121° C. | 30.0 | 32.0 |
| Scorch, MS at 121° C., T10 min. | 13.2 | 11.7 |
| Tensile Strength, MPa | 25.6 | 25.3 |
| 300% Modulus, MPa | 8.31 | 8.07 |
| Elongation, % | 631 | 624 |
| Die "C" Tear, 15 Min., kN/m | 88.6 | 99.8 |
| Shore A2 Hardness, 40 min., 20° C. | 62.0 | 60.0 |
| CMA, 2 days % | 1.95 | 2.38 |
| CMA, 7 days % | 2.92 | 3.51 |

These results show that the natural rubber compounds of the present invention have compound moisture absorption (CMA) levels approximately 18% lower, after 2 days, and approximately 17% lower, after 7 days, than the control rubber compound incorporating the carbon black with higher ash content, with the remaining properties being substantially equivalent. It is therefore expected that the fabric or wire skim compounds of the present invention will result in longer service lives in any application where moisture is known or suspected to cause a problem.

Synthetic rubber compounds were also prepared utilizing carbon blacks 3 and 4 according to the synthetic rubber formulation described in Example 1. Carbon black 3 was incorporated into Synthetic Rubber Compound G, which was a compound of the present invention. Carbon black 4 was incorporated into Synthetic Rubber Compound H which served as a control. The properties of the synthetic rubber compounds were then evaluated according to the ASTM procedures described herein. The results were as shown in Table 8:

TABLE 8

| | ASTM D3191 Synthetic Rubber Compound | |
|---|---|---|
| | G (present invention) | H (Control) |
| Carbon Black | 3 | 4 |
| Viscosity, MS4 at 121° C. | 68.8 | 67.2 |
| Scorch, MS at 121° C., T10 min. | 29.6 | 25.8 |
| Tensile Strength, MPa | 22.2 | 25.2 |
| 300% Modulus, MPa | 10.0 | 10.1 |
| Elongation, % | 568 | 585 |
| Die "C" Tear, 15 min., kN/m | 59.4 | 56.7 |
| Shore A2 Hardness, 40 min., 20° C. | 64.0 | 63.0 |
| CMA, 2 days % | 1.21 | 1.53 |
| CMA, 7 days % | 1.63 | 2.21 |

These results show that the synthetic rubber compounds of the present invention have compound moisture absorption (CMA) levels approximately 21% lower, after 2 days, and approximately 26% lower, after 7 days, than the control rubber compound incorporating the carbon black with higher ash content, with the remaining properties being substantially equivalent. It is therefore expected that the fabric or wire skim compounds of the present invention will result in longer service lives in any application where moisture is known or suspected to cause a problem.

EXAMPLE 3

FIG. 2 depicts the relationship between the ash content of a carbon black and compound moisture absorption for natural rubber incorporating the carbon black. In determining the relationship, eight carbon blacks of the ASTM N326 type, having different levels of ash, were each evaluated in the ASTM D3192 natural rubber formulation described in Example 1. The compound moisture absorption (CMA) of each of the eight natural rubber compounds was determined according to the procedures described herein. The results are depicted graphically in FIG. 2. The results indicate that 72% of the compound moisture absorption of the natural rubber compounds is attributable to the ash level of the carbon black component of the compound.

As will be clear from the description and examples contained herein, any tire, including passenger car tires, will benefit from utilization of the skim compounds of the present invention. In particular, truck tires, farm rites, airplane tires, industrial tires, and off the road tires, will benefit from utilization of the skim compound of the present invention due to the in service use which can feature non paved roads, subjecting the fires to cutting or chipping which allows moisture to penetrate the carcass and tread areas. Any other application, such as industrial rubber applications, including v-belts, conveyer belts, hoses and the like, will show similar increase in service life resulting from use of the skim compound of the present invention.

It should be clearly understood that the forms of the present invention herein described are illustrative only and are not intended to limit the scope of the invention.

I claim:

1. A process for using as a skim compound a composition having low moisture absorption properties comprising: rubber and a carbon black having an ash level of less than or equal to 0.2% by weight, a DBP of 50–160 cc/100 g, an I$_2$No. of 10–180 mg/g and a Tint value of 30–140%.

2. The process of claim 1 wherein the ash content of the carbon black is less than or equal to 0.1% by weight, the I$_2$No. of the carbon black is 50–130 mg/g and the Tint value of the carbon black is 60–140%.

3. The process of claim 1 wherein the carbon black is further characterized by having a CDBP of 40–120 cc/100 g and a CTAB of 10–125 m$^2$/g.

4. The process of claim 3 wherein the CDBP of the carbon black is 50–120 cc/100 g and the CTAB of the carbon black is 60–125 m$^2$/g.

5. The process of claim 1 wherein the rubber is selected from the group consisting of natural rubber, synthetic rubber and mixtures of natural and synthetic rubbers.

6. The process of claim 1 wherein the carbon black is present in an amount from 10 to 300 parts by weight per 100 parts by weight of the rubber.

7. An article of manufacture comprising:
a reinforcing material coated with a skim compound having low moisture absorption properties which comprises rubber and a carbon black having an ash level of less than or equal to 0.2% by weight, a DBP of 50–160 cc/100 g, an I$_2$No. of 10–180 mg/g and a Tint value of 30–140%.

8. The article of claim 7 wherein the ash content of the carbon black is less than or equal to 0.1% by weight, the I$_2$No. of the carbon black is 50–130 mg/g and the Tint value of the carbon black is 60–140%.

9. The article of claim 7 wherein the carbon black is further characterized by having a CDBP of 40–120 cc/100 g and a CTAB of 10–125 m$^2$/g.

10. The article of claim 9 wherein the CDBP of the carbon black is 50–120 cc/100 g and the CTAB of the carbon black is 60–125 m$^2$/g.

11. The article of claim 7 wherein the reinforcing material is a wire.

12. The article of claim 7 wherein the reinforcing material is a fabric.

13. The article of claim 7 wherein the carbon black is present in an amount from 10 to 300 parts by weight per 100 parts by weight of the rubber.

* * * * *